Figure 7:
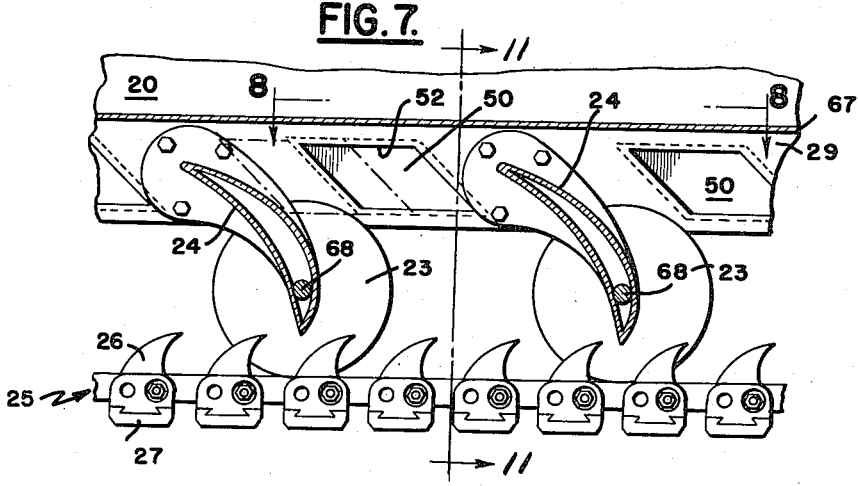

Aug. 14, 1956
E. S. CIGLEDY
2,758,561
FLUID DEFLECTOR SYSTEM FOR ENDLESS CHAIN
PROPELLERS IN AMPHIBIAN CRAFT
Filed Nov. 10, 1949
4 Sheets-Sheet 1
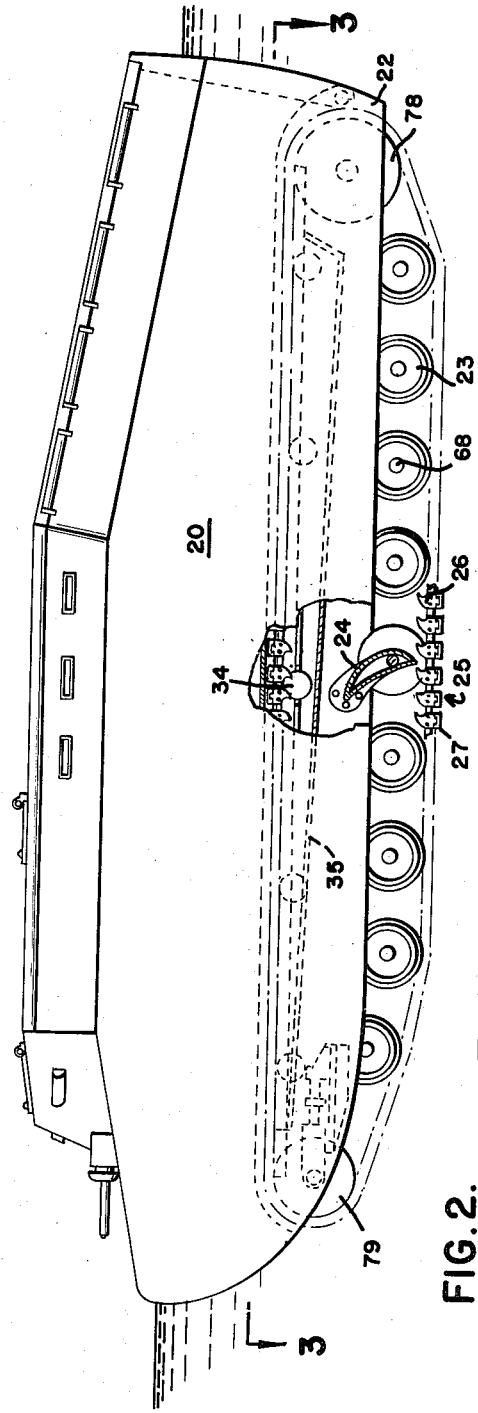
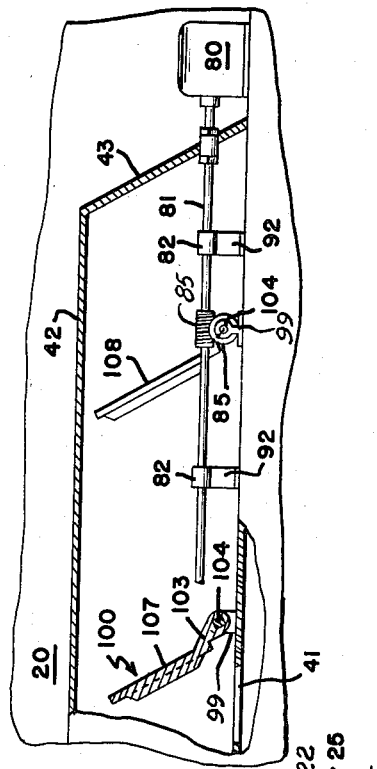
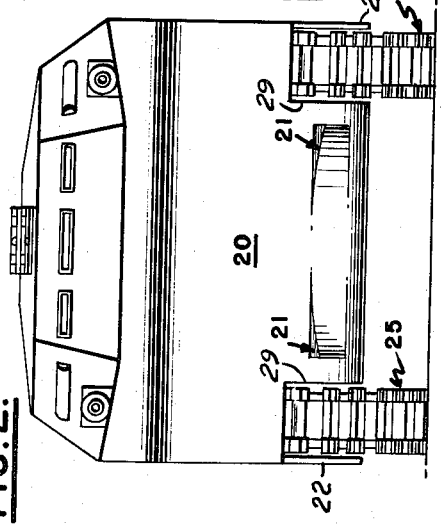
INVENTOR.
EMIL S. CIGLEDY
BY
ATTORNEY

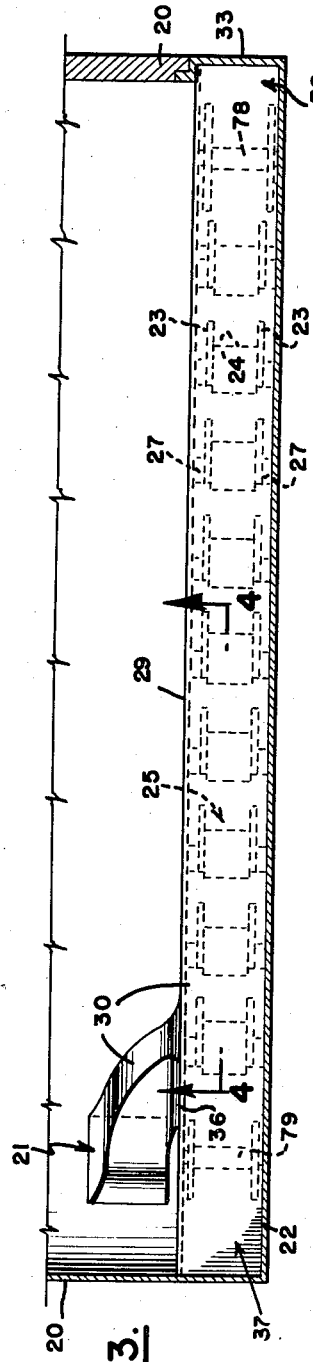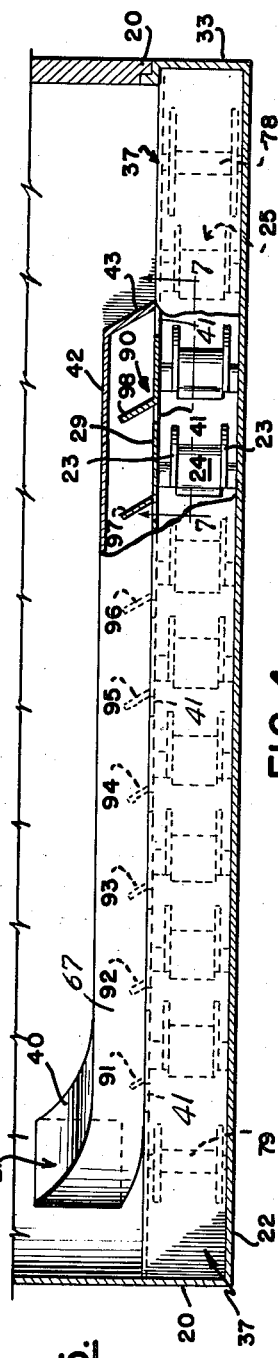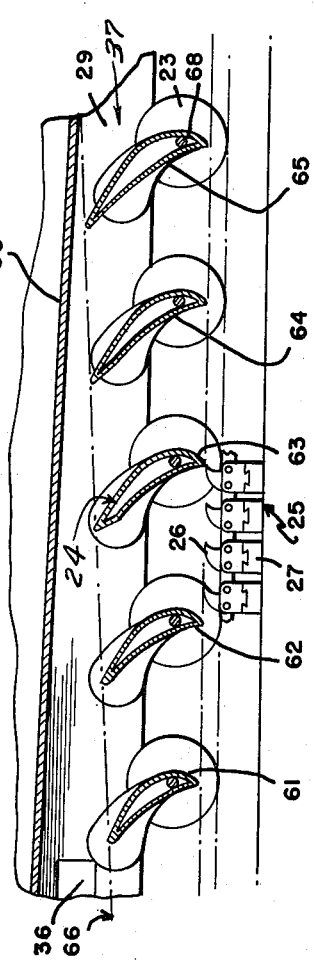

Aug. 14, 1956

E. S. CIGLEDY 2,758,561

FLUID DEFLECTOR SYSTEM FOR ENDLESS CHAIN
PROPELLERS IN AMPHIBIAN CRAFT

Filed Nov. 10, 1949

4 Sheets-Sheet 3

INVENTOR.
EMIL S. CIGLEDY
BY
ATTORNEY

Aug. 14, 1956 E. S. CIGLEDY 2,758,561
FLUID DEFLECTOR SYSTEM FOR ENDLESS CHAIN
PROPELLERS IN AMPHIBIAN CRAFT
Filed Nov. 10, 1949 4 Sheets-Sheet 4

INVENTOR
EMIL S. CIGLEDY
BY George Sipkin
B. L. Zanquill
ATTORNEYS

United States Patent Office 2,758,561
Patented Aug. 14, 1956

2,758,561

FLUID DEFLECTOR SYSTEM FOR ENDLESS CHAIN PROPELLERS IN AMPHIBIAN CRAFT

Emil S. Cigledy, Arlington, Va.

Application November 10, 1949, Serial No. 126,660

5 Claims. (Cl. 115—1)

(Granted under Title 35, U. S. Code (1952), sec. 266)

The present invention relates to endless chain propellers and more particularly to a fluid deflector system and apparatus for amphibian craft.

Prior fluid impellers for track laying amphibian vehicles have two major disadvantages. First, they attempt to adapt fixed impellers to both fluid and land travel. This results in breakage and fouling when light weight thin section impellers are used, and in loss of effective propulsion when impellers were made heavy enough to avoid breakage. Secondly, it has been proposed to attach fixed paddle members to the outside rim of an amphibian traction belt. This arrangement creates so much drag during the return travel of the belt that effective propulsion is critically diminished.

The invention of copending concurrently filed application of Willard C. Baker for "Amphibian Propulsion Mechanism," Serial No. 126,655, now U. S. Patent No. 2,680,421; avoids these and other disadvantages by providing a series of fluid impeller blades arranged in cooperating relationship with a uniform series of fluid deflector vanes. The present invention provides a novel construction and arrangement of supplemental fluid deflector means in an amphibian craft.

One object of the present invention is to provide a novel system of flow control for the propulsion mechanism of an amphibian craft.

Another object is to provide improved flow intake and inlet means for an endless chain propeller in an amphibian vehicle.

An additional object is to provide flow concentrating means therein.

A further object is to provide fluid guiding means for such an endless traction belt in an amphibian tank.

Other equally important objects and many of the advantages of the present invention become readily apparent from the following detailed description which illustrates preferred embodiments thereof when considered in connection with the accompanying drawings that diagrammatically represent in:

Figure 1, a side elevational view of air amphibian tank with a portion of the skirt cut away.

Figure 2, a front elevation of the craft of Figure 1.

Figure 3, a horizontal cross-section taken on the line 3—3 of Figure 1.

Figure 4, a vertical cross-sectional view of the belt and conduit arrangement taken on the plane 4—4 of Figure 3.

Figure 5, a horizontal cross-sectional view of a modified embodiment of the flow distributing means.

Figure 6, a plan view, partly in section, showing a modified embodiment of the baffles shown in the broken away section of Fig. 5.

Figure 7, a sectional view of the device taken on the line 7—7 of Fig. 5 looking in the direction of the arrows and showing a modified embodiment of the inlets.

Figure 8:
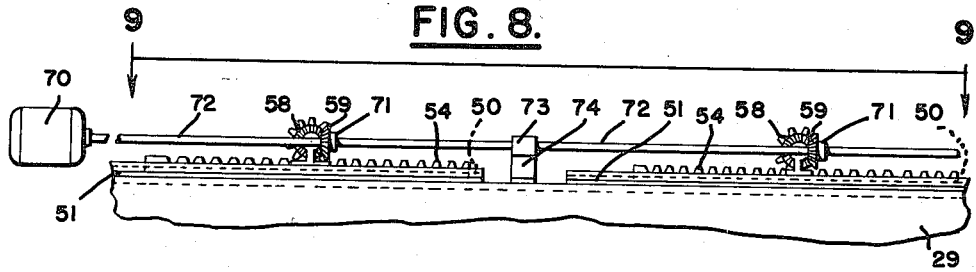

Figure 8, a plan view taken on the line 8—8 of Figure 7.

Figure 9:
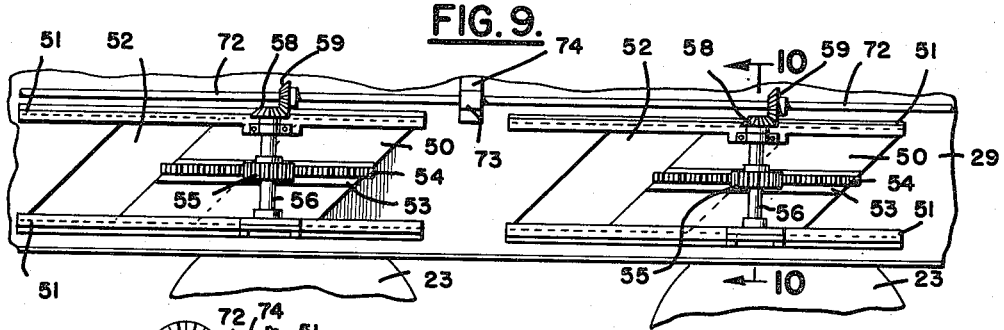

Figure 9, a side elevation of the power drive taken along the line 9—9 of Figure 8.

Figure 10:
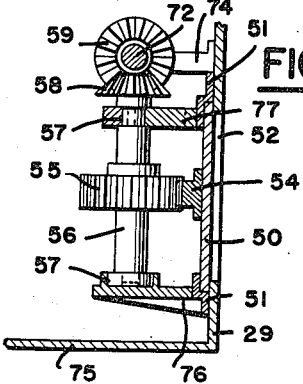

Figure 10, a cross-section taken on the line 10—10 of Figure 9.

Figure 11:
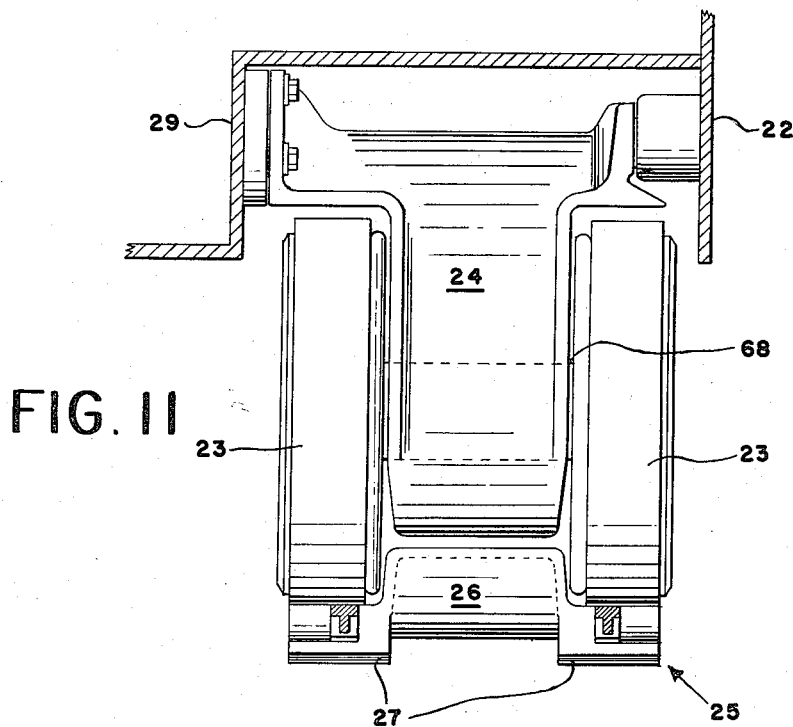

Figure 11, a sectional view of the combined tread-impeller unit taken on the line 11—11 of Fig. 7 looking in the direction of the arrows.

Figure 12:
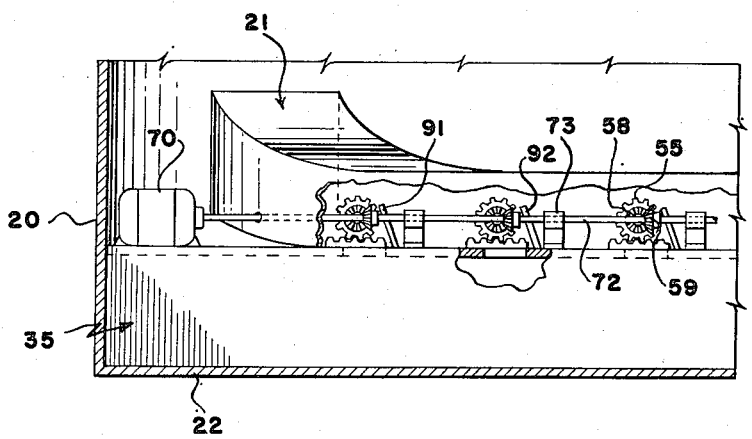

Fig. 12, a horizontal cross-sectional view of the auxiliary inlet means for the modification shown in Fig. 5, with the gearing enlarged for the sake of clarity.

A single inlet flow control means is illustrated in Figure 3 arranged in cooperation with the flow concentrating conduit 30, graduated deflector vanes 24, and endless chain propeller 25. A preferred form of bow intake 21 is shown in Figure 2 arranged in communication with the combined traction belts and endless chain propellers 25 on each side of hull 20, as shown in Figures 3 and 4, through the conduits 30.

A preferred modification of the control system of the present invention is the multiple inlet conduit shown in Figure 5 in cooperation with graduated baffles or deflectors 90, series of inlets or apertures 41, and belts 25. A preferred power drive such as motor 80 (shown in Figure 6) may be used to operate the baffles shown in the modification of that view. A preferred modification of inlets 41 is shown in Figure 7 wherein the inlets 52 are provided with shutters 50, preferably driven by motor 70 (as shown in Figure 8) and the drive mechanism illustrated in Figures 8, 9, 10 and 12.

A preferred embodiment of the present invention is embodied in the amphibian craft of Figure 1 wherein hull 20 is provided with side skirt portions 22 extending downwardly to shield the upper or return course of belt 25 and to expose the lower or fluid impelling course of the belts or endless chain propellers 25 on each side of hull 20.

The single conduit 30 is housed on the outside by skirt 22, on the inner side by wall 29, on the top by rearwardly sloping wall 35, as shown in Figures 3 and 4.

Belt 25 comprises treads 27, impeller blades constructed as described in the aforementioned copending application Serial No. 126,655. Belt 25 travels over its lower course on bogie wheels 23 supported on vanes 24 by axles 68, as shown in Fig. 11, and is thereafter driven by drive sprocket 78, over rollers 34 and idler sprocket 79 on its upper course in the customary manner.

It is preferred to provide intake or mouth 21, arranged as illustrated in Figure 2 in communication with conduits 30 as shown in Figure 3, on each side of hull 20; or in a like manner with the modified conduits 40 of Figure 5.

The single conduit 30 of Figure 3 preferably comprises the intake mouth 21, and walls 29, 22, and 35, arranged as shown in Figure 4 to form a combined duct and channel for the lower or fluid impelling course of belts 25.

Conduit 30 is provided with fluid flow inlet 36 positioned in wall 29 as shown in Figures 3 and 4, between idler sprocket 79 and the forward end of the upper or fluid-impelling course or path of belt 25. Inlet 36 communicates with belt-channel 37, formed by side skirt portions 22, walls 29 and sloping wall 35. Channel 37 is provided with the end housing 33 as shown in Figures 3 and 5. Deflector vanes 24 are fixed to the inner wall 29 of hull 20 as shown in Figure 11 and support bogie wheels 23 on axles 68. Bogie wheels 23 are arranged to rotatably support belt 25. Vanes 24 are arranged to have the effective area of each fluid engaging face progressively increased in area and height, as may be seen in positions 61, 62, 63, 64 and 65, Fig. 4. Preferably the vanes are graduated along an incline such as is indicated at 66 and that slopes upwardly and rearwardly as shown in Figure 4. This incline is a function of: the effective cross-section flow area in conduit 30, adjacent inlet area 36; of the length of the channel 37 between inlet 36 and drive sprocket 78; and of the number of deflector vanes 24, chosen for the size and ultimate service performed of the craft. These functions or factors also determine the number of the vanes 24, which is chosen so that each vane will engage only its proportional share of the total area of the cross-section of the flow in the channel 37.

A preferred modification of the single-inlet conduit 30 of Figure 3 is illustrated by the multiple-inlet conduit 40 shown in Figure 5. Conduit 40 comprises mouth 21, inner wall 42, end wall 43, front wall 29, and top wall 67. Wall 29 is provided with series of inlet apertures 41 as shown in Figure 5. Positioned adjacent to and to the rear of each of the openings 41 is a series of graduated forwardly extending baffles 90 as shown at 91, 92, 93, 94, 95, 96, 97, 98 in Figure 5. These baffles 90 are arranged to progressively increase in effective area and outward extension a manner similar to that just as heretofore described for the vanes 24. In other words, each of the baffles 91 to 98 inclusive, is arranged to present an extended effective area sufficient to engage only its proportional share of the total area of the cross-section of the flow at the forward end of conduit 40 adjacent vane 92. In a like manner the number, and the extent of the effective area, of the baffles 90 depends upon the same factors of length of craft, cross-section area of the flow and the ultimate services to be performed by the craft.

A preferred modification of the inlet apertures 41 is illustrated in Figures 7, 8 and 9 by the series of inlet apertures 52 arranged to be opened and closed by shutters 50 slideably mounted on hull 20 in guides 51.

The effective inlet area of apertures 52 may also be selectively increased or decreased by the power driven operating mechanism for sliding shutters 50 in guides 51, as illustrated in Figures 8, 9, and 10.

The arrangement of vanes 24, bogie wheels 23, axles 68, and fluid impeller blades on belt 25 is described in detail in the aforementioned application of Willard C. Baker.

Shutters 50 are mounted on racks 54 which engage pinions 55 mounted on pinion shaft 56 carried in bearings 57 housed in brackets 76 and 77 fixed to wall 29 of hull 20. To the end of shaft 56 is mounted bevel pinion 58 arranged to mesh with bevel gear 59 mounted on operating drive shaft 72 rotatably mounted in bearings 73 of brackets 74 fixed to hull 20. Drive shaft 72 is preferably driven by suitable electric motor 70 of Figure 8 in a manner well known to those skilled in the art of motor drives.

The operation of the preferred embodiment of the present invention as illustrated in Figure 1, is as follows:

Belts 25 are driven by sprockets 78 on each side of hull 20 as shown in Figure 2. As the hull 20 moves in a forward direction—belts 25 travel rearwardly over fluid impelling course 37, and back to idler sprockets 79 in a forward direction from sprockets 78 on the return course or path.

The forward motion of hull 20 causes the flow of water or other fluid medium into intake mouths 21, into the funnel portion of conduits 30 through the single inlet 36 and into the impelling portion of conduit 30 as shown in Figure 3. Here it is directed rearwardly by the rearwardly inclined roof 35 of conduit 30 as shown in Figure 4. This rearward flow is progressively engaged by deflector vanes as at positions 61, 62, 63, 64, 65, etc. in the series of vanes 24; and is thereby progressively deflected downwardly to fluid impeller blades 26 on belts 25. In this manner the horizontal component of velocity of an additional flow of fluid is delivered to belts 25 and converted into an agumented forward thrust to hull 20.

The preferred modification of the present invention that utilizes the multiple inlets 41 of Figure 5 instead of the single inlet 36 of Figure 3, operates in the following manner.

The flow of water or other fluid medium enters intake mouths 21 and as before is delivered to both sides of hull 20, but in this instance it enters the funnel portion of conducts 40, and moves rearwardly toward end wall 43. During this rearward movement the flow is progressively engaged by the progressively increasing effective face areas of baffles 91, 92, 93, 94, 95, 96, 97, 98, and progressively directed inwardly through inlets 41; then downwardly by uniform vanes 24 to fluid impeller blades 26. During this operation this fluid flow may be selectively controlled separately or concurrently as follows:

When the series 100 of power driven baffles as indicated at 107 and 108 in Fig. 6, is embodied in the hull 20, power is applied to motor 80 which rotates shaft 81 and worm 84, worm wheel 85.

Worm wheel 85 in turn rotates baffle-shaft 104 fixed in arm 103 of the baffles 100 as is indicated at baffle 107 in Figure 6. Baffle shaft 104 rides in brackets 99 and rotates baffles 100 to the open, closed, or to an intermediate position, thus controlling the flow of fluid through inlets 41.

When the series of shutters 50 shown in Figures 7, 8, 9, 10 and 12, is embodied in the hull 20, its operation is as follows: Power applied to operator motor 70 drives shaft 72 and bevel gear 59 which in turn rotates bevel gear 58. This turns shaft 56 and pinion 55 which imparts limited motion in one direction to racks 54 in rack guides 53. When motor 70 is reversed in a manner well known in the art of motor drives, the racks 54 are given limited motion in the opposite direction in rack guides 53. It will be seen from the foregoing that shutters 50 may be thereby operated in guides 51, to the open, the closed, or to an intermediate position over apertures 52.

Related hereto are the following concurrently filed co-pending applications of: Willard C. Baker and William Nicholas for "Amphibian Control Mechanism," Ser. No. 126,656, now U. S. Patent No. 2,705,470; Edward J. Eyring, for "Deflector," Ser. No. 126,654, now U. S. Patent No. 2,730,064; Edward J. Eyring, for "Deflector Mechanism," Ser. No. 126,652; and Willard C. Baker for "Amphibian Propulsion Mechanism," Ser. No. 126,655, now U. S. Patent 2,680,421; Edward J. Eyring, for "Deflector Control," Ser. No. 126,653.

The invention described herein may be manufactured and used by or for the Government of the United States of America for governmental purposes without the payment of any royalties thereon or therefor.

While only preferred embodiments of this invention have been disclosed, it is obvious that various modifications thereof are contemplated and may be resorted to by those skilled in the art without departing from the spirit and scope of the appended claims.

What is claimed is:

1. A fluid impeller for track laying amphibian vehicles comprising an endless traction belt on either side of said vehicle, treads on the belts for land travel, a plurality of curved impeller blades spaced apart along the opposite side of the belts from the treads, said impeller blades extending upwardly from the lowermost horizontal position of the belts, intake means in the forward portion of the vehicle for admitting fluid, and conduit means connected to the intake means for directing the admitted fluid against the impeller blades.

2. The combination of claim 1 including a plurality of curved deflector vanes spaced apart in said conduit, said vanes being positioned to extend downwardly toward the impeller blades thereby to direct the admitted fluid toward the blades.

3. The combination of claim 1 including a plurality of curved deflector vanes spaced apart in said conduit, said vanes being positioned to extend downwardly toward the impeller blades, said vanes being of different dimensions to thereby present in a fore to aft sequence a progressively increasing effective area to the admitted fluid.

4. A fluid impeller for track laying amphibian vehicles comprising endless traction belts on either side of said vehicle, treads on the belts for land travel, a plurality of curved impeller blades spaced apart along the opposite side of the belts from the treads, said impeller blades extending upwardly from the lowermost horizontal position of the belts, intake means in the forward portion of the vehicle for admitting fluid, conduit means connected to the intake means, a plurality of apertures along the conduit, and deflector baffles adjacent the apertures for controlling and directing the admitted fluid against the impeller blades.

5. The combination of claim 4 including power means for adjusting the effective angular position of the baffles with respect to the apertures.

References Cited in the file of this patent
UNITED STATES PATENTS

| | | |
|---|---|---|
| 512,591 | Walker | Jan. 9, 1894 |
| 2,369,996 | Baker | Feb. 20, 1945 |
| 2,404,490 | Hait | July 23, 1946 |
| 2,404,493 | Hait et al. | July 23, 1946 |
| 2,406,290 | Hait | Aug. 20, 1946 |